United States Patent
Pickren et al.

(10) Patent No.: US 10,166,745 B2
(45) Date of Patent: Jan. 1, 2019

(54) REMOVABLE FOAM TRACTION MAT

(71) Applicant: Raúl V. Fonte, New Orleans, LA (US)

(72) Inventors: Gregory Bernard Pickren, Oldsmar, FL (US); John William Salvatore, Trinity, FL (US)

(73) Assignee: Marine Mat, Inc., Oldsmar, FL (US)

( * ) Notice: Subject to any disclaimer, the term of this patent is extended or adjusted under 35 U.S.C. 154(b) by 107 days.

(21) Appl. No.: 14/863,508

(22) Filed: Sep. 24, 2015

(65) Prior Publication Data
US 2016/0129678 A1 May 12, 2016

Related U.S. Application Data

(60) Provisional application No. 62/075,957, filed on Nov. 6, 2014.

(51) Int. Cl.
*B32B 33/00* (2006.01)
*B32B 27/30* (2006.01)
(Continued)

(52) U.S. Cl.
CPC ............ *B32B 27/304* (2013.01); *B32B 5/024* (2013.01); *B32B 5/18* (2013.01); *B32B 5/22* (2013.01); *B32B 5/245* (2013.01); *B32B 7/12* (2013.01); *B32B 27/12* (2013.01); *B32B 37/182* (2013.01); *B32B 37/12* (2013.01); *B32B 2250/03* (2013.01); *B32B 2262/0246* (2013.01); *B32B 2262/0261* (2013.01); *B32B 2262/0276* (2013.01); *B32B 2262/0292* (2013.01); *B32B 2262/04* (2013.01); *B32B 2266/025* (2013.01); *B32B 2266/0207* (2013.01); *B32B 2266/0221* (2013.01);
(Continued)

(58) Field of Classification Search
CPC ..................................................... B32B 5/024
USPC ............................................................ 428/99
See application file for complete search history.

(56) References Cited

U.S. PATENT DOCUMENTS

| 4,363,684 A | 12/1982 | Hay |
| 5,806,909 A * | 9/1998 | Wise ....................... B60R 13/01 296/39.1 |

(Continued)

OTHER PUBLICATIONS

Take on BIG wave impacts with the shock absorbing Footcush, p. 1-4, Jun. 7, 2004, TackleTour, www.tackletour.com.

*Primary Examiner* — Brent T O'Hern
(74) *Attorney, Agent, or Firm* — GrayRobinson, P.A.

(57) ABSTRACT

A fiber-reinforced multi-layered structure and a fiber-reinforced CLCC foam traction mat for use in the marine, power sports and leisure industries are provided which are strong enough to have snaps installed in them, thereby allowing the structure and the mat to be snapped in place, stay snapped and be removed whenever it becomes necessary or desired. CLCC is a cross-linked-closed-cell foam compound. The mat product comprises the multi-layered structure of one or more layers of CLCC foam, one or more layers of a strong synthetic woven textile fiber, and one or more layers of a dimpled cross-linked-closed-cell foam, or equivalent non-skid base material; and a plurality of snaps, imbedded or otherwise incorporated into the multi-layered structure so as to allow the mat to be clasped and fastened to the desired surface of the marine vessel or vehicle. Techniques for forming and assembling the removable mat include conventional extrusion, laminating and rolling.

40 Claims, 4 Drawing Sheets

(51) Int. Cl.
*B32B 5/02* (2006.01)
*B32B 5/18* (2006.01)
*B32B 5/24* (2006.01)
*B32B 37/18* (2006.01)
*B32B 5/22* (2006.01)
*B32B 7/12* (2006.01)
*B32B 27/12* (2006.01)
*B32B 37/12* (2006.01)

(52) U.S. Cl.
CPC ..... *B32B 2266/08* (2013.01); *B32B 2305/022* (2013.01); *B32B 2305/188* (2013.01); *B32B 2307/54* (2013.01); *B32B 2307/5825* (2013.01); *B32B 2307/744* (2013.01); *B32B 2471/04* (2013.01); *B32B 2605/00* (2013.01)

(56) References Cited

U.S. PATENT DOCUMENTS

| | | | |
|---|---|---|---|
| 7,416,236 B2 * | 8/2008 | Boddie | B60R 11/00 296/39.2 |
| 9,254,624 B2 * | 2/2016 | Calkins | B32B 5/245 |
| 2004/0202854 A1 * | 10/2004 | Esparza | A47G 27/0212 428/314.4 |
| 2004/0250346 A1 | 12/2004 | Vasishth | |
| 2006/0246274 A1 | 11/2006 | Howells | |
| 2013/0280475 A1 | 10/2013 | Champion | |

\* cited by examiner

Tensile strength, tongue tear strength and coefficient of friction of various mat samples under similar conditions

| Sample | Sample description | Tensile strength (average maximum force at break, Direction 1) | Tensile strength (average maximum force at break, Direction 2) | Tongue tear strength (tear in warp direction) | Tongue tear strength (tear in filling direction) | Kinetic coefficient of friction |
|---|---|---|---|---|---|---|
| | | ASTM D5035 | ASTM D5035 | ASTM D2261 | ASTM D2261 | ASTM D1894 |
| A | 6-mm-thick regular CLCC foam (30% EVA) | 44.5 lbs | 44.5 lbs | 3.5 lb-f | 3.1 lb-f | 0.38 |
| B | 6-mm-thick regular CLCC foam (30% EVA), bonded to a 0.2-mm-thick layer of polyester | 178.3 lbs | 285.8 lbs | 27.4 lb-f | 20.3 lb-f | 0.99 |
| C | 6-mm-thick regular CLCC foam (30% EVA), bonded to a 0.2-mm-thick layer of polyester bonded to a 3-mm-thick layer of dimpled cross-linked-closed-cell foam (30% EVA) | 272.5 lbs | 319.3 lbs | 50.4 lb-f | 51.0 lb-f | 1.26 |

NOTE 1: Tensile strength using ASTM D5035 and tongue tear strength using ASTM D2261 are textile industry standards for material strength.
NOTE 2: The coefficient of friction using ASTM D1894 is an accurate indicator for quantifying the ability of a mat to remain attached to the floor of a marine vessel or power sport vehicle without tearing.
NOTE 3: All tests conducted in compliance with ISO/IEC 17025:2005 by Vartest Laboratories Inc., of New York, NY, an ASTM certified and accredited commercial testing facility. Noted ASTM test standards are set forth at http://www.astm.org/Standards/D5035, http://www.astm.org/Standards/D2261 and http://www.astm.org/Standards/D1894

*FIG. 4*

REMOVABLE FOAM TRACTION MAT

This application is a non-provisional application for patent entitled to a filing data and claiming the benefit of earlier-filed Provisional Application for Patent No. 62/075,957, filed on Nov. 6, 2014 under 37 CFR 1.53 (c).

FIELD OF THE INVENTION

This invention relates to a fiber reinforced foam traction mat product for use in the marine, power sports and leisure industries, which is strong enough to have snaps installed in it, thereby allowing the mat to be snapped in place, stay snapped and than be removed whenever it becomes necessary or desired. The invention makes it unnecessary to glue the mat product down; hence the mat is truly a removable mat. The invention also relates to a unique composition and structure for making foam traction mats that may be snapped to the surfaces of boats, wave runners and other marine vessels, as well as to the surfaces of snowmobiles, motorcycles, all terrain vehicles (ATVs), utility terrain vehicles (UTVs), other three-wheel or four-wheel recreational vehicles and other power sports vehicles. Particularly, this invention deals with providing a novel layered structure for manufacturing a removable mat for marine vessels and for power sports vehicles and similar applications, which layered structure has improved non-skid properties and improved strength that allow metal snaps and other types of snaps and fastening devices to be incorporated into it and be used to make a mat that is attachable to the surfaces of boats, wave runners and other marine vessels, as well as to the surfaces of snowmobiles, motorcycles, ATVs, UTVs, other three-wheel or four-wheel recreational vehicles and other power sports vehicles. The invention is also applicable to the assembling of other mats that use snaps to attach themselves to the surfaces of marine vessels, power sports vehicles and the like.

BACKGROUND OF THE INVENTION

Cross-linked-closed-cell foam ("CLCC foam") is a type of foam material that has been used since the 1980s to manufacture traction mats for boats, surfboards, jet skis, boat swim platforms, stand-up paddle boards and other such marine vessels and vehicles. Synthetic polymers are normally used to manufacture CLCC foam, usually by means of polymerization and plastic making technologies that incorporate the addition of foaming agents. Injection molding, foam extrusion, reactive foaming and gelation are some of the known methods for making synthetic polymers, sometimes referred to as "polymeric foams", that are made up of two or more polymers. The term "cross-linked" refers to the chemical bond that binds one polymer chain to another. The teen "closed-cell" refers to the fact that the structures of these polymers exhibit enclosed impermeable bubbles, or "cells", unconnected to each other within the foam. Such closed-cell foams are denser than open-cell-structured foams; they do not have interconnected pores; and they normally exhibit higher compressive strength due to such structures. Eva-Glory Industrial Co., of Taiwan, and the UltraIon Foam Group, of New Zealand, are just two of many commercial suppliers of CLCC foams. "Polymeric foam", "cross-linked polyethylene foam" and "EVA foam" are among the terms that are used in commerce to refer to these CLCC foams. The term "EVA foam" refers to the fact that, initially, many of these foam products were made from ethylene vinyl acetate (EVA) and the term continued to be used commercially even when many of the newly developed foams contained very little or even no ethylene vinyl acetate at all. In the context of this patent disclosure it will be understood that the term "CLCC foam" refers to cross-linked-closed-cell foam, and the term "EVA foam" also refers to cross-linked-closed-cell foam, including what is commonly referred to as "EVA foam", whether or not the foam contains little or no ethylene vinyl acetate at all.

CLCC foam is usually attached to the surfaces of such marine vessels or power sport vehicles by pasting a glue on the undersurface of the CLCC foam or on the surfaces for which increase traction is needed on such marine vessels or power sport vehicles, like, for example, the foot wells of a jet ski or the swim platform of a boat or the surface of a stand-up paddle board. As would be expected, such surfaces are usually wet and the people using such boats, surfboards, jet skis, platforms and other such marine vessels or power sport vehicles are often barefoot, making strong traction a most important safety feature of those vessels and vehicles. Conventional uses of EVA foam in marine applications may be found in http://hdrfurf.com/products.php?page=35

The prior practice in this field has been to use glue to stick or adhere the CLCC foam to the substrate, which is usually fiberglass. It is done this way because the CLCC foam is spongy and cannot hold a shape and will tear if not stuck to a strong surface. Gluing the foam down in this fashion makes it permanent. This means the user cannot remove the foam on occasions and then re-install it. Furthermore, the foam has a limited life and must be replaced every few years or, in some cases, every few months. The process of removing and replacing the old foam is tedious and scares away many users. This has been a problem in the marine industry where suppliers of CLCC foam traction mats often try to sell boat builders on gluing foam in the interior of the boat (in addition to the swim platform).

A number of compositions and techniques based on or related to CLCC foam have been used in the past for various purposes and with different results. Thus, U.S. Pat. No. 6,258,862, of Matz at al. covers a specific composition for applications in the manufacturing of foam sheets used in the motor vehicle industry. The patented composition includes polyolefin, propylene polymer and EVA. PVC is essentially described as undesirable for the patented composition. Snaps are not mentioned by Matz et al. U.S. Pat. No. 7,503,820, of Cheung, addresses a rigid, multi-layered, laminated recreational sports board, for riding waves and the like, comprised of a polymer film layer, a polyethylene foam layer and an extruded adhesive resin layer. A copolymer of EVA is mentioned as an example of the stipulated polyethylene foam layer. Anhydrite-modified EVA is mentioned as one of the kinds of adhesive resin layers that may be used. The layers are bonded to each other; and several combinations of layers and suggested compounds are discussed for carrying out lamination techniques. There is no reference in the Cheung '820 patent to any synthetic fiber providing enough strength to an EVA foam layer to allow the finished product to be secured to a marine vessel surface by means of snaps. Nor is there anything in the Cheung '820 patent about the structure being attachable to the surface of a marine vessel, or about it being removable. U.S. Pat. Publication No. 20060228537, of Cheung, and U.S. Pat. Publication No. 20080026197, also of Cheung, disclose a rigid multi-layered foam composite glider that may be used as a body board, a snow slide or the like, as well as a method for improving the surface smoothness of a polyolefin film on a polyethylene foam core glider. The composition of the glider includes EVA foam and a polymer film layer. The method uses extrusion to form the laminated glider structure. There are no disclosures of using snaps in these publications. U.S. Pat. Publication No. 20080210366, of Chen, discloses a method for manufacturing mats that are said to be light in weight, flexible and slippery-proof. Automobile mats, bathroom mats, Yoga mats, household door mats and sidewalk mats are contemplated. The particular method claimed involves the use of an extruder, rollers, a knurling wheel, a discharge tank and so forth. EVA foam, polyethylene, polypropylene, polyolefin foam and other polymer substances are used. There are no disclosures of using snaps in this publication. U.S. Pat. Publication No. 20130280475, of Champion describes a multi-layered marine vessel cushion pad for marine applications that uses EVA and is said to be removable and provide good traction. The pad is sometimes referred to as the "deck cover" or as the "assembly". The patent application claims the assembly structure as well as a method for making it. Three layers are preferred. The deck of a marine vessel is the surface to which the pad may be fastened and from where it may be easily removed. Champion's objective is providing good cushioning to reduce shock and impact on humans and equipment on board, not providing strength to the EVA foam assembly to allow it to be fastened to the marine deck without tearing. Snaps are not mentioned. Instead, the means for attaching the assembly to the marine deck are hook-or-eye fastener elements such as Velcro. There are no references to the use of polyester in Champion. U.S. Pat. Publication No. 20140069337, of Dunford, claims an improved dog mat made of cross-linked, closed-cell polyolefin elastomeric or EVA foam with a continuous thin, waterproof soft outer skin that is said to be tear resistant. An odor repellant may be added to the mat. Dunford does not mention synthetic textile woven fabrics, PVC, snaps or marine applications.

Several other compositions and techniques have also been used in the past for certain marine applications for various purposes and with different results. Among them. U.S. Pat. Publication No. 20040121117, of Peterson, describes a marine vessel outdoor carpet that is made of foam and that is said to be removable and detachable by providing it with snap heads and sockets mounted in and spaced along the unpadded carpet border to be snapped directly to the snap studs mounted on the deck surface. The main novel feature claimed by Peterson is that his carpets are cushioned to provide foot comfort to the standing helmsman on the vessel. The foam cushion padding is adhered to the underside of the carpet. Peterson does not mention EVA or synthetic textile fabrics.

It is apparent that a need exists for a reinforced CLCC foam traction mat product that does not have to be glued to the surface of the marine vessel and that is strong enough to have snaps installed in it. With snaps installed in the mats, the mats could be snapped in place and than removed as necessary; and there would no longer be a need to glue down the CLCC foam. The known prior art does not allow for snaps because conventional CLCC foam is too soft and the snaps get pulled out of the foam too easily. Also, the foam is too soft and tears easily. The present invention is directed toward providing such reinforced CLCC foam traction mat product with snaps, incorporated into the mat structure, which allow the mat to be snapped in place and then removed as necessary.

It is an object of this invention to provide a reinforced CLCC foam traction mat product with improved strength that allows the use of snaps to easily and conveniently attach and detach the mat product to and from marine surfaces, such as the surfaces of boats and other marine vessels, as well as to and from the surfaces of snowmobiles, ATVs, UTVs and other such power sport vehicles. It is also an object of this invention to provide a multi-layered structure specifically designed for such surface applications into which snaps may be incorporated in order to make a truly removable traction mat without the limitations associated with some of the mats currently available from other sources. A further object is to provide a traction mat for such marine and power sport applications that makes use of a unique multi-layered structure that increases its tensile strength and which allows the mat to be attached and removed by means of snaps without constantly tearing off the snaps when attaching or removing them. Vet a further object is to provide a practicable traction mat for marine and power sport applications that comprises a combination of a unique multi-layered structure with snaps, incorporated into said multi-layered structure, that has excellent traction (non-skid) properties and that is truly attachable and removable my means of snaps that do not separate from the mat when attaching or removing them. A further object of the invention is to provide a truly removable CLCC foam mat that is flexible and easy to roll and therefore offer an added competitive advantage when being shipped and/or handled. Another object is to provide a removable CLCC foam mat with the aforementioned attributes which may be manufactured and assembled by means of conventional techniques such as extrusion, laminating and rolling. An additional purpose of the invention is to describe a method for properly assembling such improved strength, removable traction mat. These and other objects will be apparent to those skilled in the art from the description that follows.

SUMMARY OF THE INVENTION

The present invention revolves around the concept of a unique combination of four key features that have not been combined in this particular fashion before. The four key features are: (a) one or more layers of cross-linked-closed-cell foam; (b) one or more layers of a synthetic woven textile fiber; (c) one or more layers of a dimpled cross-linked-closed-cell foam, or equivalent non-skid base material; and (d) a plurality of snaps, imbedded or otherwise incorporated into the mat product so as to allow the mat product to be clasped and fastened to the desired surface of the marine vessel or power sport vehicle. Techniques for forming and assembling the removable mats include adhesion, laminating and rolling. The foam product of this invention has a layer of a strong synthetic woven textile fiber applied to it. When applied in the manner stipulated herein this synthetic woven textile fiber provides the additional strength needed for snaps to be incorporated into the foam and for the resulting multi-layered foam product to be strong enough to stand alone and not tear without being glued to a rigid substrate such as the floor of a boat or an ATV. The amount of commercial CLCC foam used is between about 30% and 90% of the weight of the formed multi-layered structure assembly. The preferred L. foam is polyolefin elastomer foam made from polyethylene that is cross linked and closed cell. Examples of other CLCC foams suitable for making the multi-layered structure include ethylene vinyl acetate foam, ethylene-olefin inter-polymers foam, olefin block copolymers foam, polyolefin foam and cross-linked polyethylene foam. These foams are commercially available, often under trade names such as Infuse™ (Dow Chemical), Engage™ (Dow Chemical), Plastazote® foam (Kewell-Converters), Supazote® foam (Kewell-Converters), Isolon EPE™ (Izhevsk Plastics Plant) and Isolon EVA™ (Izhevsk Plastics Plant). The foams may be used individually or blended with each other in making the multi-layered structure. The preferred synthetic woven textile fiber is polyester. Examples of other strong synthetic woven textile fibers that may be used include acetate, acrylic, Kevlar, latex, nylon, rayon and spandex. The amount of synthetic woven textile fiber used is between about 2% and 30% of the weight of the formed multi-layered structure assembly. Synthetic woven textile fibers are textiles manufactured from man-made rather than natural fibers, and are often referred to as "woven synthetic fabrics" or simply "synthetic fabrics". They are usually made by joining monomers into polymers by the process of polymerization using chemicals derived from coal, oil and/or natural gas to make threads that are then woven together to make the fabrics. A layer of dimpled cross-linked-closed-cell foam or equivalent non-skid base material is applied to the fiber reinforcement on the undersurface of the CLCC foam product. The dimpled cross-linked-closed-cell foam or equivalent non-skid base material should have a high coefficient of friction and be textured so as to provide good anti-skid properties to the multi-layered structure and the mat product. The amount of dimpled cross-linked-closed-cell foam or equivalent non-skid base material should be between about 30% and 70% of the weight of the formed multi-layered structure assembly. Materials that have high coefficients of friction and thus are able to impart nonskid properties to the multilayered structure also include rubber, cork, abrasive grit and polyvinyl chloride, commonly referred to as "PVC".

The combination of the top layer of cross-linked-closed-cell foam, the strong synthetic woven textile fiber and the dimpled cross-linked-closed-cell foam or equivalent non-skid base material comprises a multi-layered structure to which a number of snaps are then integrated by riveting or other conventional techniques. The snaps are preferably round metallic snaps, but they also may be made of plastic or other materials and have square or other shapes. Four or six snaps are usually sufficient to secure relative small or medium size mats to the desired surfaces of the vessels or vehicles, but more or less snaps may be used depending on the size of the mats and the surfaces to be covered by them. The removable CLCC foam traction mats of the invention are a convenient substitute for carpets in boats. The boating industry has searched for years for a substitute for carpets. Carpets in boats are not so desirable because they do not weather well, get moldy, tend to end up soggy when in use, and tend to look old very quickly. Techniques for forming and assembling the removable mats are described with reference to a particularly preferred embodiment of the invention below.

BRIEF DESCRIPTION OF THE FIGURES

A clear understanding of the key features of the invention summarized above may be had by reference to the appended figures. Accordingly:

FIG. 4 shows a tabulation of results obtained from tests conducted in order to compare critical properties affecting the ability of a mat to remain attached to the surface of a vessel or vehicle for different assemblies of layers, including the assembly of layers used in the removable CLCC foam traction mat of the invention.

DETAILED DESCRIPTION OF THE INVENTION

Figure 1:
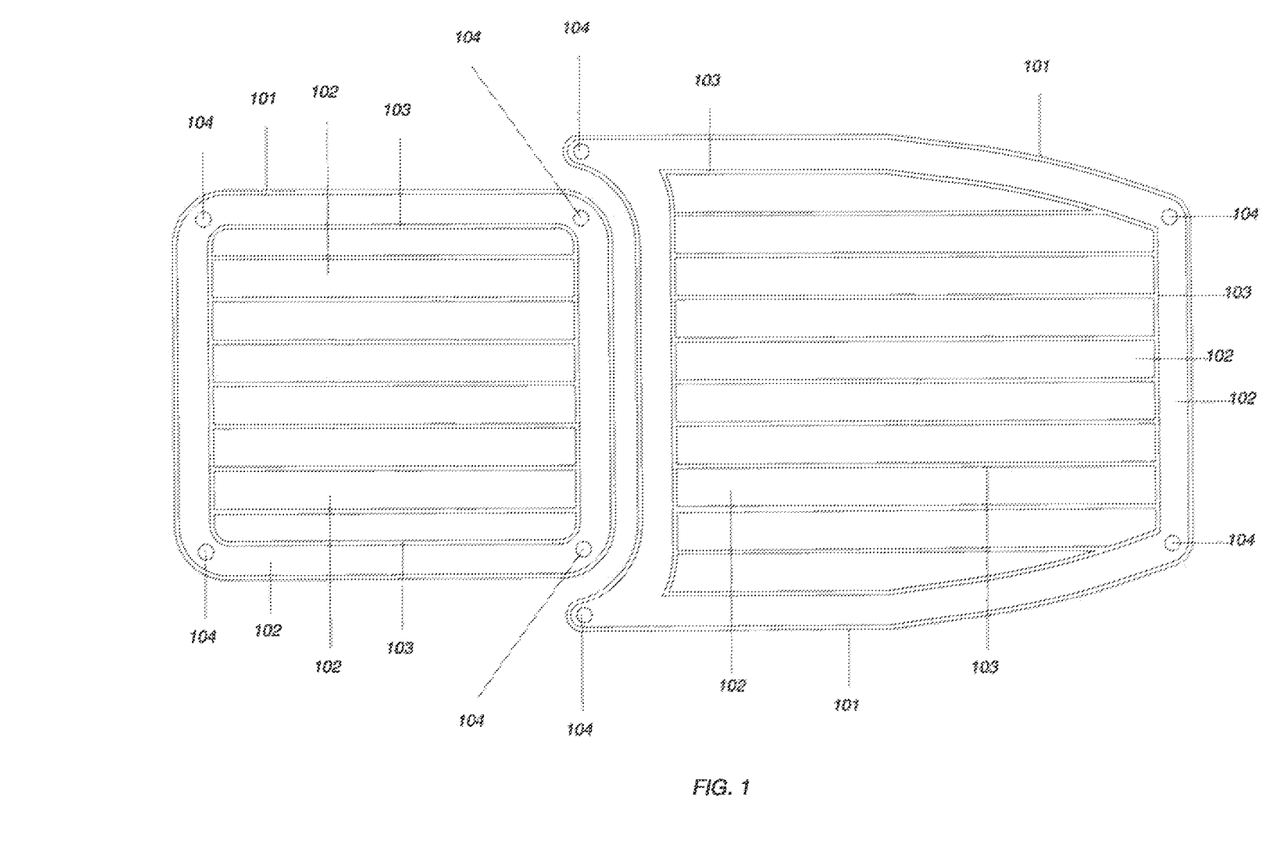
FIG. 1 is an illustration of the removable CLCC foam traction mat of the invention showing its components.

FIG. 1 is a top view of two removable CLCC foam traction mats as laid on the surface of a boat in one typical fashion contemplated by the invention. As stated above, CLCC foam is sometimes referred to as "EVA foam" by commercial suppliers. The two EVA foam mats have been cut and sized to conveniently fit a particular area of the boat. The mats can also be cut and sized in many other shapes and sizes to suit other types and sizes of areas to be covered on boats and other marine vessels and/or power sport vehicles. Referring to each removable CLCC traction mat 101 in FIG. 1, upper outer surface 102 is made of EVA foam that has been bonded to a second layer of EVA foam 103, which is in turn bonded to a strong synthetic woven textile fiber (not seen in the top view), which is in turn bonded to the lower outer surface of the mat (not seen in the top view) and made of dimpled cross-linked-closed-cell foam. Round metal snaps 104 have been imbedded through the three layers of EVA foam, synthetic woven textile fiber and dimpled cross-linked-closed-cell foam by riveting.

Figure 2:
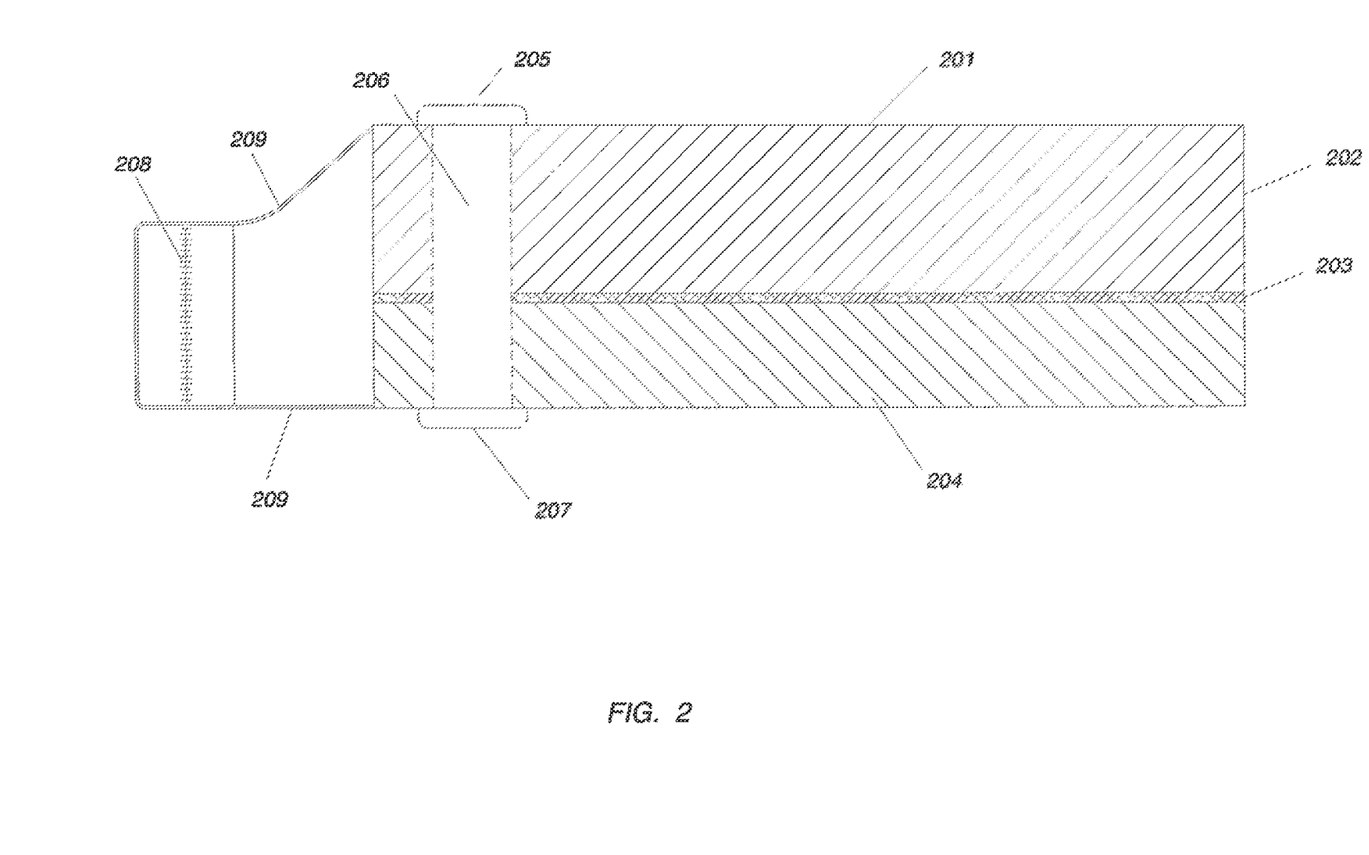
FIG. 2 is a side view of a multi-layered structure of CLCC foam, strong synthetic woven textile fiber and dimpled cross-linked-closed-cell foam to which the stipulated snaps have been incorporated by riveting.

FIG. 2 is a side view of one embodiment of the multi-layered structure of EVA foam, strong synthetic woven textile fiber and dimpled cross-linked-closed-cell foam to which the stipulated snaps of the invention have been incorporated by riveting. Accordingly, referring to FIG. 2, multi-layered structure 201 is comprised of a 6-millimeter-thick upper outer surface layer of EVA foam 202 that has been bonded to a 0.2-millimeter-thick middle inner surface layer of strong synthetic woven textile fiber 203. Middle inner surface layer 203 is bonded to a 3.0-millimeter-thick lower outer surface layer of dimpled cross-linked-closed-cell foam 204. Dimpled cross-linked-closed-cell foam may be made by feeding a smooth sheet of cross-linked-closed-cell foam into embossing rollers programmed to impart a desired dimple profile on the foam. Embossing rollers often make use of hot oil to provide heat to the foam that is being embossed. The smooth-surface foam is fed into the hot rollers at room temperature and comes out hot and embossed with dimples. After a brief cool-down period the dimpled foam is ready for use in making the multi-layered structure of the invention. Other techniques may be used for embossing the foam and making dimpled cross-linked-closed-cell foam. A preferred dimpled cross-linked-closed-cell foam for use in making the multi-layered structure of the invention will have anywhere between about 1,000 and 10,000 dimples per square foot of surface. The layer of dimpled cross-linked-closed-cell foam not only provides the desirable non-skid properties but allows the bottom of the multi-layered structure to "breath" better, allowing the circulation of air and a concomitant reduction of moisture in the structure. With a reduction in moisture comes a reduction in the amount of mold that tends to form as a result of moisture accumulation. The overall result is a multi-layered structure that is not only stronger enough to have snaps installed in it but a truly removable traction mat with improved non-skid attributes that stays in place and can be attached and detached when necessary or desirable.

The head 205 of round metal snap 206 sits snuggly on top of upper outer surface layer of EVA foam 202. Round metal snap 206 has been riveted to and penetrates the three layers 202, 203 and 204 ending in cap or snap bottom 207 which takes the shape of a round clasp suitable for and adaptable to receive the stud or head of a corresponding mating snap (not shown) on the surface of a boat or other vessel or vehicle. The snaps are preferably riveted to the multi-layered structure by means of a hand arbor press.

The thicknesses of the three layers described above are illustrative of preferred thicknesses for the particular embodiment shown in FIG. 2. Similar and various other thicknesses may be used to suit different applications. For most applications a thickness of between about 3 millimeters and 10 millimeters is preferred for the upper layer of EVA foam; a thickness of between about 0.1 millimeters and 0.5 millimeters is preferred for the middle layer of strong synthetic woven textile fiber; and a thickness of between about 3 millimeters and 6 millimeters is preferred for the lower layer of dimpled cross-linked-closed-cell foam. In completing the fabrication of the mat it is often convenient to mechanically bind its perimeter to minimize any tendency of the layers that comprise the multi-layered structure to separate and to provide a certain degree of finishing to the final product. When this is done the preferred means for mechanically binding the perimeter is stitching 208. A binding 209 may also be added around the perimeter, for example, by stitching, to also minimize any tendency of the layers to separate and to provide a certain degree of finishing to the final product. The preferred material for binding is a polyester fabric. Beveling a portion of the perimeter may also be convenient when sewing around it and/or binding it.

Figure 3:
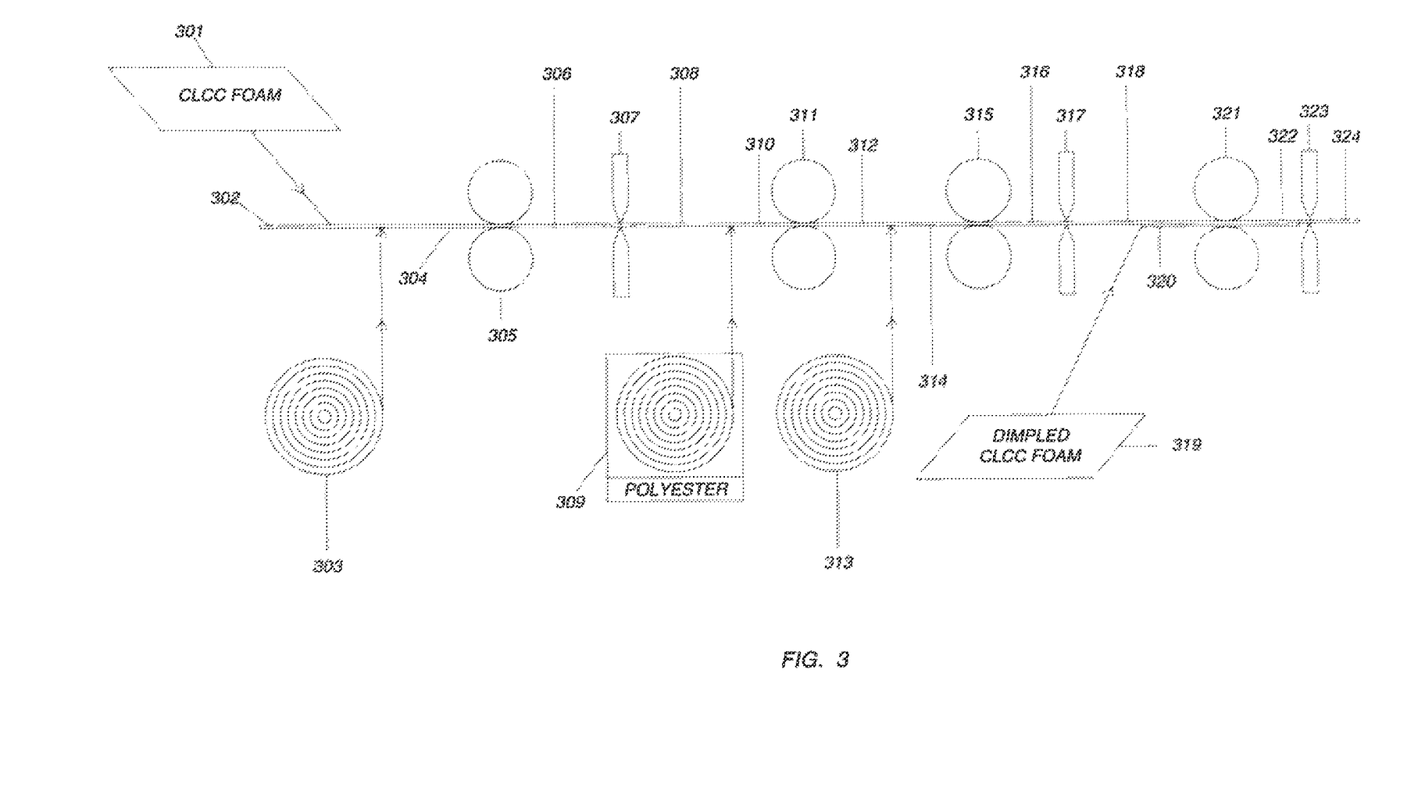
FIG. 3 shows a process flow diagram of a preferred embodiment for assembling the multi-layered structure of CLCC foam, strong synthetic woven textile fiber and dimpled cross-linked-closed-cell foam.

FIG. 3 is a process flow diagram of a preferred embodiment for assembling the multi-layered structure of CLCC foam, synthetic woven textile fiber and dimpled cross-linked-closed-cell foam of the invention. Thus, referring to FIG. 3, 6-millimeter-thick layer of CLCC foam sheet 301, having an ethylene vinyl acetate content of 30%, is fed to assembly line 302 where it contacts double-side pressure-sensitive adhesive ("PSA") tape 303, applied to its lower surface, and it is than directed, as sheet 304, to rolling pinch presses 305 to secure good adhesion of PSA tape 303 to its lower surface. Coming out of the rolling pinch presses 305 knife 307 is used to slit the layers of sheet 306 and remove excess material. Resulting sheet 308 is then contacted with 0.2-mm-thick layer of polyester 309, applied to its lower surface by adhering it to the other side of PSA tape 303. Resulting sheet 310 is then directed to rolling pinch presses 311 to secure good adhesion, laminate them and provide strong bonding between the layer of the CLCC foam and the polyester. Subsequently, the bonded and laminated layers 312 of CLCC foam and polyester are contacted with double-side PSA tape 313, applied to their lower surface and directed, as sheet 314, to rolling pinch presses 31 to secure good adhesion of PSA tape 313 to their lower surface. Coming out of the robing pinch presses 315 knife 317 is used to slit the layers of sheet 316 and remove excess material. Resulting sheet 318 is then contacted on the assembly line with 3-mm-thick layer of dimpled cross-linked-closed-cell foam 319, having an ethylene vinyl acetate content of 30%. The layer of dimpled cross-linked-closed-cell foam 319 is applied to the lower surface of sheet 318 by adhering it to the other side of PSA tape 313. Resulting sheet 320 is then directed to roving pinch presses 321 to secure good adhesion, laminate them and provide strong bonding between the layer of polyester and the layer of dimpled cross-linked-closed-cell foam. Knife 323 is used to slit the layers of well-bonded sheet 322 and remove excess material. The resulting product sheet 328, which is made up of well-bonded layers of CLCC foam, polyester and dimpled cross-linked-closed-cell foam, constitutes a good example of the multi-layered structure of the invention.

The snaps are preferably incorporated into the bonded multi-layered structure 324 by riveting as already described above. A hand arbor press is used to crimp together the two parts of each snap. The number and placement of the snaps will be dictated by the size and dimensions of the sheet of bonded multi-layered structure used for assembling the various removable mats. As an illustration, four snaps placed approximately on the four corners of a four-foot-by-four-foot bonded multi-layered structure will usually suffice in most cases for a medium-size boat surface. The snaps may also be incorporated into the multi-layered structure at specific locations to match the locations of corresponding mating studs that have been installed on the surface of a vessel or vehicle by the manufacturer of such vessel or vehicle.

Tests were conducted by an ASTM-certified and accredited commercial testing facility in order to compare critical properties affecting the ability of a mat to remain attached to the floor of a typical marine vessel or power sport vehicle. Different assemblies of layers of different materials, including the assembly of layers used in the removable CLCC foam traction mat of the invention, were subjected to various tensile and elongation forces under similar conditions. FIG. 4 shows the results obtained from these tests.

As shown in FIG. 4, Sample A was a 6-millimeter-thick regular layer of CLCC foam having an ethylene vinyl acetate content of 30%. Sample A was subjected to increasing tensile forces and to increasing tongue tear forces by conventional ASTM procedures at the testing facility of Veriest Laboratories in New York. The average maximum force at which Sample A sustained a break, i.e., its tensile strength, was 44.5 lbs (pounds) in direction 1 and 44.5 lbs (pounds) in direction 2. The average tongue-tear strength (tear in warp direction) of Sample A was determined to be 3.5 lb-f (pound foot), whereas its average tongue-tear strength (tear in filling direction) was 3.1 lb-f (pound foot). The kinetic coefficient of friction of Sample A was 0.38.

Sample B was a 6-millimeter-thick regular layer of CLCC foam, also having an ethylene vinyl acetate content of 30%, that was bonded to a 0.2-mm-thick-layer of polyester fabric at the bottom, i.e., at its lower surface. Sample B was subjected to increasing tensile forces and to increasing tongue tear forces by the same conventional ASTM procedures as Sample A at the testing facility of Vartest Laboratories. The average maximum force at which Sample B sustained a break, i.e., its tensile strength, was 178.3 lbs in direction 1 and 285.8 lbs in direction 2. The average tongue-tear strength (tear in warp direction) of Sample B was determined to be 27.4 lb-f, whereas its average tongue-tear strength (tear in filling direction) was 20.3 lb-f. The kinetic coefficient of friction of Sample B was 0.99.

Sample C was a 6-millimeter-thick regular layer of CLCC foam, also having an ethylene vinyl acetate content of 30%, that was also bonded to a 0.2-mm-thick-layer of polyester fabric at the bottom. The 0.2-mm-thick-layer of polyester fabric at the bottom was in turn bonded at its lower surface to a 3-mm-thick layer of dimpled cross-linked-closed-cell foam that also had an ethylene vinyl acetate content of 30%. Sample C was a typical example of the multi-layered structure of the invention. This sample was subjected to increasing tensile forces and to increasing tongue tear forces by the same conventional ASTM procedures as Samples A and B at the Vartest testing facility. As shown in FIG. 4, the average maximum force at which Sample C sustained a break, i.e., its tensile strength, was 272.5 lbs in direction 1 and 319.3 lbs in direction 2. The average tongue-tear strength (tear in warp direction) of Sample C was determined to be 50.4 lb-f, whereas its average tongue-tear strength (tear in filling direction) was 51.0 lb-f. The kinetic coefficient of friction of Sample C was 1.26.

The results of the tests tabulated in FIG. 4 clearly show that the unique multi-layered structure provided by the system of the invention (Sample C) has superior and improved strength that allows metal snaps and other similar types of snaps to be incorporated into it and used to attach the mat to the surfaces of boats, ATVs and other marine vessel and power sport vehicles. Furthermore, these results also show that the multi-layered structure of Sample C also has a substantially higher kinetic coefficient of friction than those of the layered structures of Samples A and B, thus allowing the mat of the invention to remain attached to said surfaces. The result is a unique and superior combination of components that yield improved and superior results and provide a truly superior removable foam traction mat for these applications.

It will be understood that the appended figures depict preferred embodiments of the present invention and, therefore, are not to be considered as limiting its scope with regard to other embodiments which the invention is capable of contemplating. While the invention has been described in terms of particular embodiments and applications, in both summarized and detailed forms, it is not intended that these descriptions in any way limit its scope to any such embodiments and applications, and it will be understood that various substitutions, changes and variations in the described embodiments, applications and details of the method and system illustrated herein and of their operation can be made by those skilled in the art without departing from the spirit of this invention. Unless otherwise required by the technical import of the sentence in the context in which it is used, the use of the singular article "a" in the appended claims of this application shall be understood to mean at least one.

We claim:

1. A removable cross-linked-closed-cell foam traction mat comprising:
   a layer of a cross-linked-closed-cell foam having an upper foam surface a lower foam surface, a foam weight, and a foam thickness;
   a layer of a synthetic woven textile fiber having an upper fiber surface, a lower fiber surface, a fiber weight, a fiber thickness, a tensile strength, and a tongue tear strength, the upper fiber surface of the layer of synthetic woven textile fiber bonded to the lower foam surface of the cross-linked-closed-cell foam;
   a layer of a non-skid base compound having an upper base compound surface, a lower base compound surface, a base compound weight, and a base compound thickness, the upper base compound surface of the layer of non-skid base compound bonded to the lower fiber surface of the layer of synthetic woven textile fiber, thereby forming a multi-layered structure having a structure weight and a kinetic coefficient of friction; and
   a plurality of snaps, imbedded or otherwise incorporated into the multi-layered structure so as to allow the mat to be clasped and fastened to a desired location.

2. The removable cross-linked-closed-cell foam traction mat of claim 1, wherein the cross-linked-closed-cell foam is selected from the group consisting of polyethylene-based polyolefin elastomer foam, ethylene vinyl acetate foam, ethylene-olefin inter-polymers foam, olefin block copolymers foam, polyolefin foam, cross-linked polyethylene foam and blends thereof.

3. The removable cross-linked-closed-cell foam traction mat of claim 1, wherein the foam weight of the cross-linked-closed-cell foam is about 30% to 90% of the structure weight.

4. The removable cross-linked-closed-cell foam traction mat of claim 1, wherein the tensile strength (ASTM D5035) of the layer of synthetic woven textile fiber is at least 2.8 lbs maximum force at break (direction 1) and 2.5 lbs maximum force at break (direction 2), and wherein the tongue tear strength (ASTM D2261) of the layer of synthetic woven textile fiber is at least 1.0 lb-f (tear in warp direction) and 1.0 lb-f (tear in filling direction).

5. The removable cross-linked-closed-cell foam traction mat of claim 1, wherein the fiber weight of the layer of synthetic woven textile fiber is about 2% to 30% of the structure weight.

6. The removable cross-linked-closed-cell foam traction mat of claim 1, wherein the synthetic woven textile fiber is selected from the group consisting of acetate, acrylic, Kevlar, latex, nylon, polyester, rayon and spandex.

7. The removable cross-linked-closed-cell foam traction mat of claim 1, wherein the synthetic woven textile fiber is polyester.

8. The removable cross-linked-closed-cell foam traction mat of claim 1, wherein the base compound weight of the layer of the non-skid base compound is about 30% to 70% of the structure weight.

9. The removable cross-linked-closed-cell foam traction mat of claim 1, wherein the non-skid base compound is a PVC-based compound and the kinetic coefficient of friction (ASTM D1894) is 1.0 or higher.

10. The removable cross-linked-closed-cell foam traction mat of claim 1, wherein the plurality of snaps are riveted into the multi-layered structure.

11. The removable cross-linked-closed-cell foam traction mat of claim 1, wherein the upper fiber surface and lower foam surface are bonded by applying an acrylic-based pressure sensitive adhesive to the upper fiber surface of the layer of synthetic woven textile fiber, adhering the layer of synthetic woven textile fiber to the lower foam surface of the cross-linked-closed-cell foam thereby forming an adhered layer, and then subjecting the adhered layer to lamination in one or more pinch roller presses.

12. The removable cross-linked-closed-cell foam traction mat of claim 1, wherein the upper base compound surface and lower fiber surface are bonded by applying an acrylic-based pressure sensitive adhesive to the lower fiber surface, adhering the layer of base compound to the lower fiber surface thereby forming a second adhered layer, and subjecting the second adhered layer to lamination in one or more pinch roller presses.

13. The removable cross-linked-closed-cell foam traction mat of claim 1, wherein the foam weight is approximately 60% of the structure weight; the fiber weight is approximately 10% of the structure weight; and the base compound weight is approximately 30% of the structure weight.

14. The removable cross-linked-closed-cell foam traction mat of claim 1, wherein the foam thickness is approximately 6 millimeters; the fiber thickness is approximately 0.2 millimeters; and the base compound thickness is approximately 3 millimeters.

15. A removable traction mat for marine and power sport applications comprising a formed multi-layered structure having a structure weight and a plurality of snaps riveted imbedded or otherwise incorporated into the formed multi-layered structure so as to allow the mat to be clasped and fastened to desired locations the formed multi-layered structure comprising:
- a layer of cross-linked-closed-cell foam having an upper foam surface and a lower foam surface, the layer of cross-linked-closed-cell foam having a foam thickness of between about 3 and 10 millimeters and constituting about 30% to 90% of the structure weight;
- a layer of a synthetic woven textile fiber having an upper fiber surface and a lower fiber surface, the layer of synthetic woven textile fiber having a fiber thickness of between about 0.1 and 0.5 millimeters and constituting about 2% to 30% of the structure weight, the upper fiber surface bonded to the lower foam surface thereby forming a first bonded layer; and
- a layer of a non-skid base compound having an upper base compound surface and a lower base compound surface, the layer of non-skid base compound having a base compound thickness of between about 3 and 6 millimeters and constituting about 30% to 70% of the structure weight, the upper base compound surface bonded to the lower fiber surface thereby forming the formed multi-layered structure.

16. A removable cross-linked-closed-cell foam traction mat comprising:
- a top layer of cross-linked-closed-cell foam having an upper foam surface, a lower foam surface, a foam weight, and a foam thickness;
- a middle layer of a synthetic woven textile fiber having a fiber weight, a fiber thickness, a tensile strength, a tongue tear strength, an upper fiber surface, and a lower fiber surface, the upper fiber surface bonded to the lower foam surface;
- a bottom layer of a dimpled cross-linked-closed-cell foam having a bottom layer weight, an upper bottom layer surface, and a lower bottom layer surface, the upper bottom layer surface bonded to the lower fiber surface thereby forming a multi-layered structure having a structure weight; and
- a plurality of snaps, imbedded or otherwise incorporated into the multi-layered structure so as to allow the mat to be clasped and fastened to a desired location.

17. The removable cross-linked-closed-cell foam traction mat of claim 16, wherein the cross-linked-closed-cell foam is selected from the group consisting of polyethylene-based polyolefin elastomer foam, ethylene vinyl acetate foam, ethylene-olefin inter-polymers foam, olefin block copolymers foam, polyolefin foam, cross-linked polyethylene foam and blends thereof.

18. The removable cross-linked-closed-cell foam traction mat of claim 16, wherein the foam weight is about 30% to 90% of the structure weight.

19. The removable cross-linked-closed-cell foam traction mat of claim 16, wherein the tensile strength (ASTM D5035) of the synthetic woven textile fiber is at least 2.8 lbs maximum force at break (direction 1) and 2.5 lbs maximum force at break (direction 2), and wherein the tongue tear strength (ASTM D2261) of the synthetic woven textile fiber is at least 1.0 lb-f (tear in warp direction) and 1.0 lb-f (tear in filling direction).

20. The removable cross-linked-closed-cell foam traction mat of claim 16, wherein the fiber weight is about 2% to 30% of the structure weight.

21. The removable cross-linked-closed-cell foam traction mat of claim 16, wherein the synthetic woven textile fiber is selected from the group consisting of acetate, acrylic, Kevlar, latex, nylon, polyester, rayon and spandex.

22. The removable cross-linked-closed-cell foam traction mat of claim 16, wherein the synthetic woven textile fiber is polyester.

23. The removable cross-linked-closed-cell foam traction mat of claim 16, wherein the bottom layer weight is about 30% to 70% of the structure weight.

24. The removable cross-linked-closed-cell foam traction mat of claim 16, wherein the dimpled cross-linked-closed-cell foam is polyethylene-based polyolefin elastomer foam and the multi-layered structure has a kinetic coefficient of friction (ASTM D1894) of 1.0 or higher.

25. The removable cross-linked-closed-cell foam traction mat of claim 16, wherein the plurality of snaps is riveted into the multi-layered structure of cross-linked-closed-cell foam, synthetic woven textile fiber and dimpled cross-linked-closed-cell foam.

26. The removable cross-linked-closed-cell foam traction mat of claim 16, wherein the upper fiber surface and lower foam surface are bonded together by applying an acrylic-based pressure sensitive adhesive to the upper fiber surface, adhering the middle layer to the lower foam surface thereby forming an adhered layer, and subjecting the adhered layer to lamination in one or more pinch roller presses.

27. The removable cross-linked-closed-cell foam traction mat of claim 16, wherein the upper bottom layer surface to the lower fiber surface are bonded together by applying an acrylic-based pressure sensitive adhesive to the lower fiber surface, adhering the upper bottom layer surface to the lower fiber surface thereby forming a lower adhered layer and subjecting the lower adhered layer to lamination in one or more pinch roller presses.

28. The removable cross-linked-closed-cell foam traction mat of claim 16 wherein the foam weight is approximately 60% of the structure weight; the fiber weight is approximately 10% of the structure weight; and the bottom layer weight is approximately 30% of the structure weight.

29. The removable cross-linked-closed-cell foam traction mat of claim 16 wherein the top layer is approximately 6 millimeters thick; the middle layer is approximately 0.2 millimeters thick; and the bottom layer is approximately 3 millimeters thick.

30. A removable traction mat for marine and power sport applications comprising a formed multi-layered structure having a structure weight and a plurality of snaps riveted into the formed multi-layered structure so as to allow the mat to be clasped and fastened to desired locations, the formed multi-layered structure comprising:
- a top layer of cross-linked-closed-cell foam having an upper foam surface and a lower foam surface, the top layer of cross-linked-closed-cell foam having a thickness of between about 3 and 10 millimeters and constituting about 30% to 90% of the structure weight;
- a middle layer of a synthetic woven textile fiber having an upper fiber surface and a lower fiber surface, the middle layer of synthetic woven textile fiber having a thickness of between about 0.1 and 0.5 millimeters and constituting about 2% to 30% of the structure weight, wherein the upper fiber surface is bonded to the lower foam surface; and a bottom layer of a dimpled cross-linked-closed-cell foam having an upper bottom layer surface and a lower bottom layer surface, the bottom layer of a dimpled cross-linked-closed-cell foam having a thickness of between about 3 and 6 millimeters and constituting about 30% to 70% of the structure weight, wherein the upper bottom layer surface is bonded to the lower fiber surface, thereby forming the formed multi-layered structure.

31. A formed multi-layered structure having a structure weight for use in manufacturing a removable traction mat for marine and power sport applications, the formed multi-layered structure comprising:
a layer of cross-linked-closed-cell foam having an upper foam surface and a lower foam surface, the layer of cross-linked-closed-cell foam having a thickness of between about 3 and 10 millimeters and constituting about 30 to 90% of the structure weight;
a layer of a synthetic woven textile fiber having an upper fiber surface and a lower fiber surface, the layer of synthetic woven textile fiber having a thickness of between about 0.1 and 0.5 millimeters and constituting about 2% to 30% of the structure weight, the upper fiber surface bonded to the lower foam surface; and
a layer of a non-skid base compound having an upper bottom layer surface and a lower bottom layer surface, the layer of non-skid base compound having a thickness of between about 3 and 6 millimeters and constituting about 30% to 70% of the structure weight, wherein the upper bottom layer surface is bonded to the lower fiber surface thereby forming the formed multi-layered structure.

32. The formed multi-layered structure of claim 31, wherein the cross-linked-closed-cell foam is selected from the group consisting of polyethylene-based polyolefin elastomer foam, ethylene vinyl acetate foam, ethylene-olefin inter-polymers foam, olefin block copolymers foam, polyolefin foam, cross-linked polyethylene foam and blends thereof.

33. The formed multi-layered structure of claim 31, wherein the synthetic woven textile fiber is selected from the group consisting of acetate, acrylic, Kevlar, latex, nylon, polyester, rayon and spandex.

34. The formed multi-layered structure of claim 31, wherein the synthetic woven textile fiber is polyester.

35. The formed multi-layered structure of claim 31, wherein the non-skid base compound is a PVC-based compound and the multi-layered structure has a kinetic coefficient of friction (ASTM D1894) of 1.0 or higher.

36. A formed multi-layered structure having a structure weight for use in manufacturing a removable traction mat for marine and power sport applications, the formed multi-layered structure comprising:
a top layer of cross-linked-closed-cell foam having an upper foam surface and a lower foam surface, the top layer having a thickness of between about 3 and 10 millimeters and constituting about 30% to 90% of the structure weight;
a middle layer of a synthetic woven textile fiber having an upper fiber surface and a lower fiber surface, the middle layer having a thickness of between about 0.1 and 0.5 millimeters and constituting about 2% to 30% of the structure weight, wherein the upper fiber surface is bonded to the lower foam surface; and
a bottom layer of a dimpled cross-linked-closed-cell foam having an upper bottom layer surface and a lower bottom layer surface, the bottom layer having a thickness of between about 3 and 6 millimeters and constituting about 30% to 70% of the structure weight, wherein the upper bottom layer surface is bonded to the lower fiber surface, thereby forming the formed multilayered structure.

37. The formed multi-layered structure of claim 36, wherein the cross-linked-closed-cell foam is selected from the group consisting of polyethylene-based polyolefin elastomer foam, ethylene vinyl acetate foam, ethylene-olefin inter-polymers foam, olefin block copolymers foam, polyolefin foam, cross-linked polyethylene foam and blends thereof.

38. The formed multi-layered structure of claim 36, wherein the synthetic woven textile fiber is selected from the group consisting of acetate, acrylic, Kevlar, latex, nylon, polyester, rayon and spandex.

39. The formed multi-layered structure of claim 36, wherein the synthetic woven textile fiber is polyester.

40. The formed multi-layered structure of claim 36, wherein the dimpled cross-linked-closed-cell foam is polyethylene-based polyolefin elastomer foam and the formed multi-layered structure has a kinetic coefficient of friction (ASTM D1894) of 1.0 or higher.

* * * * *